United States Patent [19]
Anderson et al.

[11] Patent Number: 6,064,673
[45] Date of Patent: May 16, 2000

[54] COMMUNICATIONS SYSTEM HAVING DISTRIBUTED CONTROL AND REAL-TIME BANDWIDTH MANAGEMENT

[75] Inventors: Pehr Anderson; Chris Gadda, both of Cambridge, Mass.

[73] Assignee: 3Com Corporation, Santa Clara, Calif.

[21] Appl. No.: 08/886,687

[22] Filed: Jul. 1, 1997

Related U.S. Application Data

[60] Provisional application No. 60/023,001, Aug. 2, 1996.

[51] Int. Cl.[7] .................................................. H04L 12/28
[52] U.S. Cl. .......................................... 370/389; 370/404
[58] Field of Search .................................... 370/392, 238, 370/448, 404, 412, 465, 350–356, 389

[56] References Cited

U.S. PATENT DOCUMENTS

| | | | |
|---|---|---|---|
| 4,100,377 | 7/1978 | Flanagan | 179/15 |
| 4,317,195 | 2/1982 | Barberis et al. | 370/412 |
| 4,507,782 | 3/1985 | Kunimasa et al. | 371/32 |
| 4,546,212 | 10/1985 | Crowder, Sr. | 179/2 |
| 4,581,735 | 4/1986 | Flamm et al. | 370/85 |
| 4,712,214 | 12/1987 | Meltzer et al. | 371/32 |
| 4,771,425 | 9/1988 | Baran et al. | 370/85 |
| 4,841,526 | 6/1989 | Wilson et al. | 371/32 |
| 4,870,661 | 9/1989 | Yamada et al. | 375/122 |
| 4,885,749 | 12/1989 | Golden | 371/32 |
| 4,888,767 | 12/1989 | Furuya et al. | 370/95.2 |
| 4,903,261 | 2/1990 | Baran et al. | 370/94.2 |
| 4,908,828 | 3/1990 | Tikalsky | 371/69.1 |
| 4,947,484 | 8/1990 | Twitty et al. | 371/37.1 |
| 4,970,714 | 11/1990 | Chen et al. | 370/17 |
| 4,985,892 | 1/1991 | Camarata | 370/123 |
| 5,010,553 | 4/1991 | Scheller et al. | 371/35 |
| 5,084,877 | 1/1992 | Netravali et al. | 371/32 |
| 5,103,467 | 4/1992 | Bedlek et al. | 375/118 |
| 5,148,429 | 9/1992 | Kudo et al. | 370/9.42 |
| 5,168,497 | 12/1992 | Ozaki et al. | 370/94.1 |
| 5,191,583 | 3/1993 | Pearson et al. | 370/94.1 |
| 5,287,182 | 2/1994 | Haskell et al. | 348/500 |
| 5,386,438 | 1/1995 | England | 375/121 |
| 5,412,642 | 5/1995 | Nunokawa | 370/17 |
| 5,526,353 | 6/1996 | Henley et al. | 370/404 |
| 5,533,108 | 7/1996 | Harris et al. | 379/201 |
| 5,533,115 | 7/1996 | Hollenbach et al. | 379/220 |
| 5,854,900 | 12/1998 | Kalkunte et al. | 395/448 |

*Primary Examiner*—Chi H. Pham
*Assistant Examiner*—Brenda H. Pham
*Attorney, Agent, or Firm*—McGlew & Tuttle, P.C.

[57] ABSTRACT

A communications system and method utilizes peer-to-peer architecture to provide "quality" real-time communications in a non-guaranteed, packet-based network. Quality real-time communications in a non-guaranteed, packet-based network is achieved by (i) minimizing packet loss, (ii) minimizing latency, and (iii) minimizing the artifacts caused by packet loss. The system distributes control of functionality to the peer communication devices, thereby eliminating the need for a central processor to establish peer-to-peer communications. Each of the peer communication devices has the capability to respond to variations in network loading to provide quality real-time communications.

18 Claims, 2 Drawing Sheets

COMMUNICATIONS SYSTEM HAVING DISTRIBUTED CONTROL AND REAL-TIME BANDWIDTH MANAGEMENT

RELATED APPLICATION

This application claims the benefit of U.S. Provisional Application No. 60/023,001, filed Aug. 2, 1996.

FIELD OF THE INVENTION

This invention relates to real-time communications systems and methods. More particularly, the invention relates to real-time communications systems and methods that provide distributed control and real-time bandwidth management.

BACKGROUND OF THE INVENTION

Since the first protocols for sending packetized data over networks were established, many have endeavored to send packetized voice signals over the same network infrastructure. The challenge has not been whether voice signals can be sent in packetized format, but rather whether packetized voice signals can be sent reliably and of equivalent quality to that of traditional switch-based telephone systems, all at a price that is cost-competitive with these traditional telephone systems.

The general view has been that because voice signals require real-time transmission, voice communications must have a "guaranteed" bandwidth channel as in traditional switch-based telephone systems in order to provide the desired quality of service. This view has led to the creation of protocols (e.g., Asynchronous Transfer Mode (ATM) and IsoEthernet) that provide virtual, dedicated channels for voice and other real-time applications and a separate virtual data channel. Networks that implement these protocols are expensive. These high costs have limited the growth of the installed base of these products. The most affordable and the most dominant network protocol is standard (IEEE 802.3) 10BaseT Ethernet, which does not provide a virtual guaranteed bandwidth channel. The large installed base of 10 MBit Ethernet has created an incentive for the development of improved Ethernet protocols, such as 100 MBit, 1 GBit and switched Ethernet, all with backward compatibility for 10 MBit Ethernet.

For many years, the communications industry has been interested in using a data network infrastructure to carry voice (or audio) signals. There are several reasons for this interest. In general, it is less expensive and less complicated to offer telephony, messaging and computer integration over a single network infrastructure than over separate infrastructures. By sending voice over the data network, it is possible to merge the functionality of advanced telephone systems with the power, scaleability and open connectivity of networking solutions.

It has been known in the communications industry for many years that computer-based applications can be used to increase the functionality of telephone systems. For example, an entire industry has been created to develop and sell personal computer (PC) based applications that increase the efficiency of telephone call centers. The PC has also been used as voice messaging platform. Finally, several companies have developed complete telephone systems by building telephone switching hardware into the network server. A typical configuration of such a system includes ISA bus cards connected via a separate telephony bus (e.g., the signal computing system architecture (SCSA) bus and the multi-vendor interpolation protocol (MVIP) bus) to provide both telephone station connections and central office (CO) telephone connections. In each of these cases, the computer network and the telephone network remain separate, but they are linked using hardware and software tie-ins from the PC or network server to either the desktop telephone or to the telephone system switch.

In contrast, sending packetized voice over the same network infrastructure as packetized data eliminates the need for two infrastructures and makes it possible to take advantage of advanced computer telephony and PC messaging applications running on the data network without the expense of hardware and software links. Another well-known advantage of packetized voice (or audio) is the ability to transfer signals over wide area network infrastructures (e.g., the Internet) as a means of saving on toll charges for telephone usage. Various products have been introduced to send packetized audio over the Internet, in particular. Some of these products include accessories that interface with the Private Branch Exchange (PBX) to enable the time-division multiplexed digital signal to be converted into a packet-based digital signal.

In summary, the advantages of sending voice and data over the same infrastructure have been recognized for some time. Several companies have discussed systems that operate both the voice and data communications over the same network infrastructure (i.e., one wire for both voice and data). The challenge has been to provide quality of service for voice and other applications that need real-time bandwidth even when a network is heavily loaded with data traffic, and to do so in a cost-effective manner.

SUMMARY OF THE INVENTION

The present invention features a system and method that utilizes peer-to-peer architecture to provide quality of service for real-time communications over a non-guaranteed, packet-based network. Voice is an example of real-time communications and standard Ethernet is an example of a non-guaranteed, packet-based network protocol. Quality real-time communications in a non-guaranteed, packet-based network is achieved by (i) minimizing packet loss, (ii) minimizing latency, and (iii) minimizing the artifacts caused by packet loss.

The invention employs a peer-to-peer architecture to distribute control of system functions. Each of the peer communication devices (e.g., telephones, central office lines, voice mail channels, automated attendant channels, database managers) is equipped with hardware and software to perform various system functions and has the capability to respond to variations in network loading to maintain real-time quality audio.

In one aspect, the invention features a method for achieving peer-to-peer communications in a packet-based communications network. A plurality of peer communication devices (e.g., telephones, central office lines, voice mail channels, automated attendant channels, database managers) are connected via a packet based communications network. The network can be any packet based network, such as an Ethernet network (e.g., 10BaseT, 10Base2, 100BaseTX, 100BaseVG anylan, or fiber).

A sending peer communication device converts raw data (e.g., audio signals) into digital data and encodes the digital data into packets. In one detailed embodiment, the digital data is encoded into packets using one or more of the following data processing techniques: (a) compression; (b) redundancy; and (c) interleaving. The one or more data packets are transmitted from the sending peer communication device over the network to a receiving peer communication device.

In one embodiment, the sending peer communication device utilizes an Ethernet protocol to transmit the data packets to the receiving peer communication device. In another embodiment, the sending peer communication device utilizes at least one of the following processing techniques to transmit the data packets to the receiving peer communication device: (i) reducing the Ethernet interpacket gap time for retransmitted data packets; (ii) reducing the expected time delays associated with the Ethernet exponential backoff algorithm; and (iii) repeating the transmitting step beyond the Ethernet retry limit. The expected time delays associated with the Ethernet exponential backoff algorithm are reduced by using at least one of the following techniques: (i) reduction of the time between retries; and (ii) resetting the normal Ethernet retry algorithm based on the number of collisions or elapsed time.

The receiving peer communication device decodes the data packets into digital data. In one detailed embodiment, the receiving peer communication device decodes the data packets into digital data using one or more of the following data processing techniques: (i) decompression; or (ii) deinterleaving. The decoded packets of digital data are converted into a continuous stream of digital data. The continuous stream of digital data is then converted into raw data (e.g., audio signals).

The receiving peer communication device queues the data packets of encoded digital data in a playback queue in order to convert the data packets into the contiguous stream of digital data. The receiving peer communication device also synchronizes the rate at which digital data is removed from the playback queue with the rate at which digital data is added to the playback queue to compensate for clock skew between the sending and receiving peer communication devices. In one detailed embodiment, during the conversion process, the receiving peer communication device uses one or more of the following reconstruction techniques to mask the effects of missing decoded packets of the digital data: (i) interpolation; or (ii) redundancy.

In another aspect, the invention features a method for achieving peer-to-peer communications in a packet-based communications network. A plurality of peer communication devices (e.g., telephones, central office lines, voice mail channels, automated attendant channels, database managers) are connected via a packet based communications network. The network can be an Ethernet network (e.g., 10BaseT, 10Base2, 100BaseTX, 100BaseVG anylan, or fiber). A sending peer communication device converts raw data (e.g., audio signals) into digital data and encodes the digital data into packets.

The receiving peer communication device decodes the data packets into digital data. The receiving peer communication device converts the decoded packets of digital data into a continuous stream of digital data using the following processing techniques: (i) queuing the data packets of encoded digital data in a playback queue; (ii) synchronizing the rate at which digital data is removed from the playback queue with the rate at which digital data is added to the playback queue to compensate for clock skew between the sending and receiving peer communication devices; and (iii) using one or more of the following reconstruction techniques to mask the effects of missing decoded packets of digital data (a) interpolation, or (b) redundancy. The continuous stream of digital data is then converted into raw data (e.g., audio signals).

One important feature of the invention is that the sending and receiving communication devices are programmed to optimize the processing techniques described above based on network conditions to achieve peer-to-peer communications with (i) minimal packet loss, (ii) minimal latency, and (iii) minimal artifacts caused by packet loss.

BRIEF DESCRIPTION OF THE DRAWINGS

These and other features of the invention are more fully described below in the detailed description and accompanying drawings of which the figures illustrate a communications system and method that provides distributed control and real-time bandwidth management.

DETAILED DESCRIPTION

Figure 1:
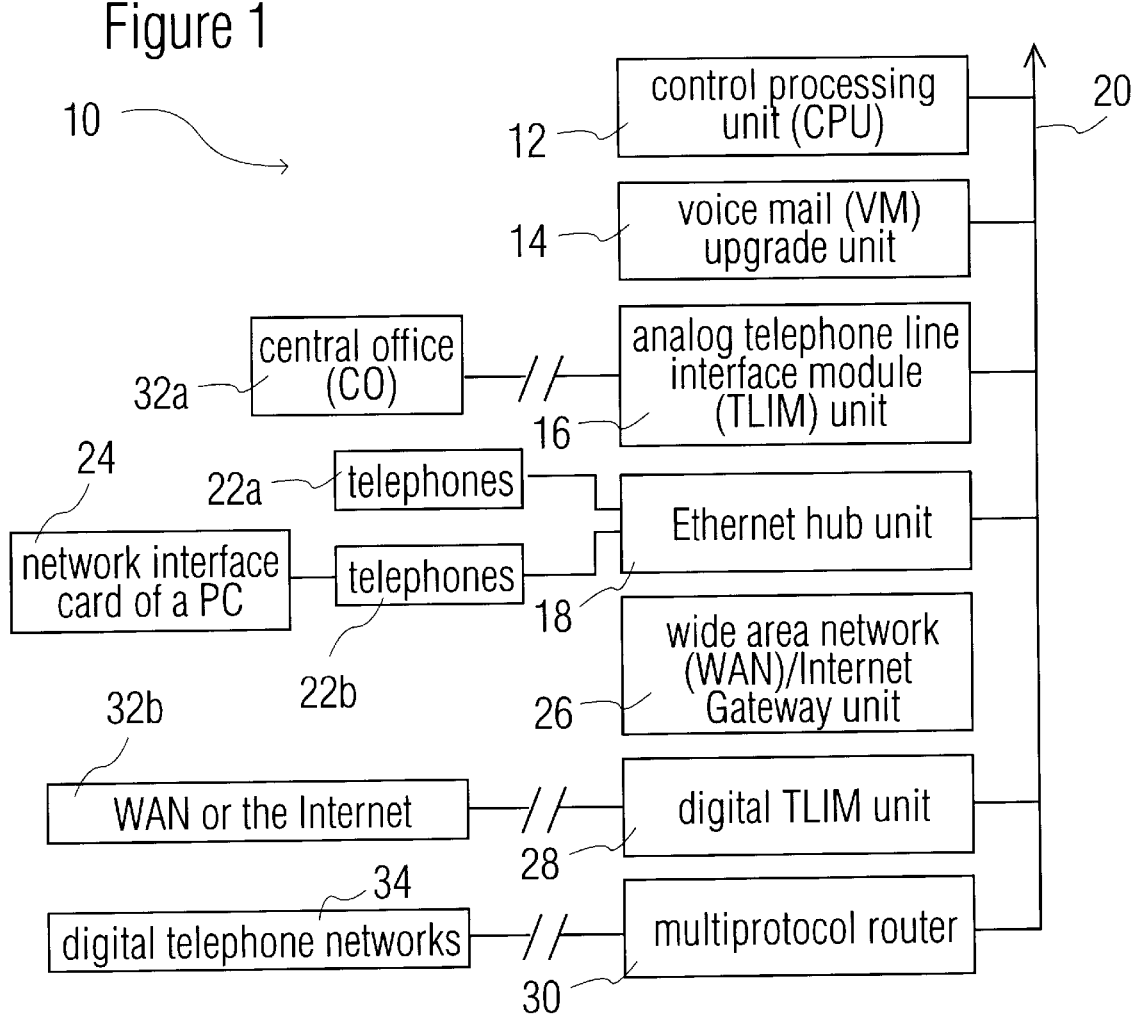
FIG. 1 is a block diagram of a packet-based communications system incorporating the principles of the invention.

FIG. 1 is a block diagram of a packet-based communications system incorporating the principles of the invention. The system 10 includes five basic components: (i) a control processing unit (CPU) 12; (ii) a voice mail (VM) upgrade unit 14; (iii) an analog telephone line interface module (TLIM) unit 16; (iv) an Ethernet hub unit 18; and (v) telephones 22a, 22b. These five components, along with additional components described below, can be modules that plug into a motherboard in a housing. The system 10 is controlled by embedded software (FIGS. 2 and 3) and operates over a packet-based communications network (e.g., Ethernet) 20.

The CPU 12 is the master processor in the system. The CPU supports the following system functions: (i) configuration and call control management, (ii) database management; (iii) voicemail and automated attendant management; (iv) TCP/IP processing including IP Gateway, Computer Telephone Integration (CTI), and Internet configuration support. The control unit 12 supports a predetermined number of hours of stored voice mail. Because larger business customers may desire increased voice mail storage capability, the VM upgrade unit 14 can be included for additional voice mail storage and a variety of configuration options.

The system 10 also includes an analog TLIM unit 16 that connects to the central office (CO) 32a of a telephone service provider via the public switched telephone network (PSTN). The unit 16 can include any number of TLIMs for continuing expansion of the system 10. The telephones 22a, 22b are connected to the network 20 by the Ethernet hub unit 18. Although two telephones are shown for simplicity of illustration reasons, the system is expected to include many additional telephones in a typical installation. The telephones 22a, 22b do not depend upon or even require a PC to operate in the system 10. However, the telephones may contain an Ethernet hub, which makes it possible to connect the telephone to the network interface card of a PC 24. As shown, the telephone 22b is connected to the PC 24.

The system can also include additional components that support increased system features and functionality. These additional components include: (i) a wide area network (WAN)/Internet Gateway unit 26; (ii) a digital TLIM unit 28; and (iii) a multiprotocol router 30. The WAN/Internet Gateway unit 26 provides signal processing support for WAN or Internet communications. The digital TLIM unit 28 includes any number of digital TLIM modules for connection to public or private digital telephone networks (e.g., ISDN, PRI, BRI, TI/E1) 32b. The multiprotocol router 30 is an off the shelf device that connects the system 10 to a WAN or the Internet 34 for communications with remote telephones or other telephony interfaces (such as PCs).

The various components in the system 10 are controlled by embedded software. The fundamental goals of this software are to generate packets of digitized audio signals within the sending peer communication device and send such packets to the appropriate receiving peer communication device. The receiving device simultaneously interprets received audio signals and generates audio signals from the audio packets, while at the same time sending its own signals. This process is complicated by the analog TLIM interface, the digital TLIM interface, the WAN/Internet interface, the voice mail and automated attendant connections, not to mention the other voice and data traffic on the network 20. To overcome these problems, the software performs various control functions that are capable of managing voice traffic in such a complicated environment. At the core of the system are the protocols necessary to transport the voice traffic.

Figure 2:
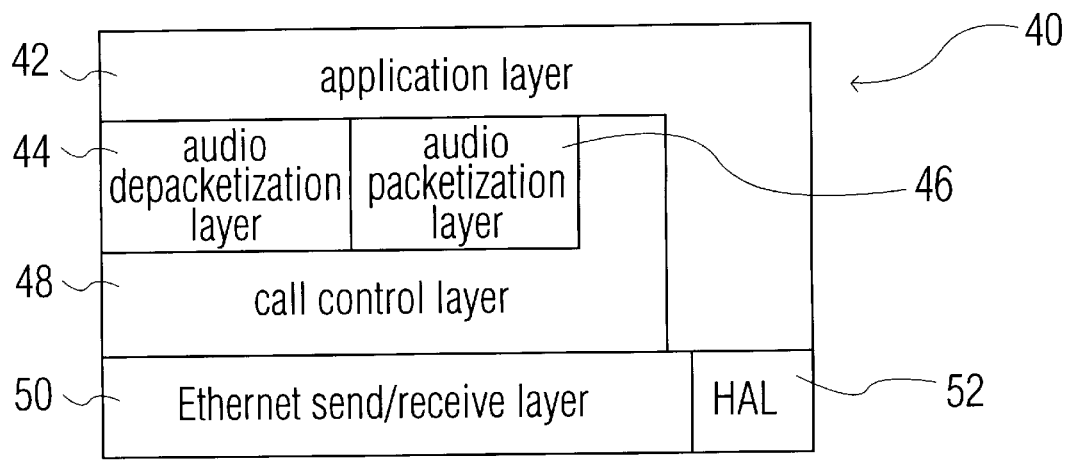
FIG. 2 is an illustration of the protocol stack utilized by the embedded software within the packet-based communications system of FIG. 1.

FIG. 2 is an illustration of the protocol stack utilized in the system. The protocol stack 40 includes an application layer 42, an audio packetization layer 44, an audio depacketization layer 46, a call control layer 48, and Ethernet layer 50 and a hardware abstraction layer (HAL) 52. The HAL 52 is a software layer that refers to certain hardware functions performed by the peer devices on the system (e.g., telephones, analog and digital TLIMs, the WAN/Internet Gateway, the CPU, voicemail and automated attendant). At the HAL 52, audio signals are converted to digital data for the application layer 42 and digital data received from the application layer is converted to audio signals. The application layer 42 passes digital data to the audio packetization layer 44 and receives digital data from the audio depacketization layer 46. The audio packetization layer 44 provides data packets to and the depacketization layer 46 receives data packets from the call control layer 48. The call control layer provides data packets to and receives data packets from the Ethernet layer 52. The details of the data flow through the protocol stack are explained below.

Figure 3:
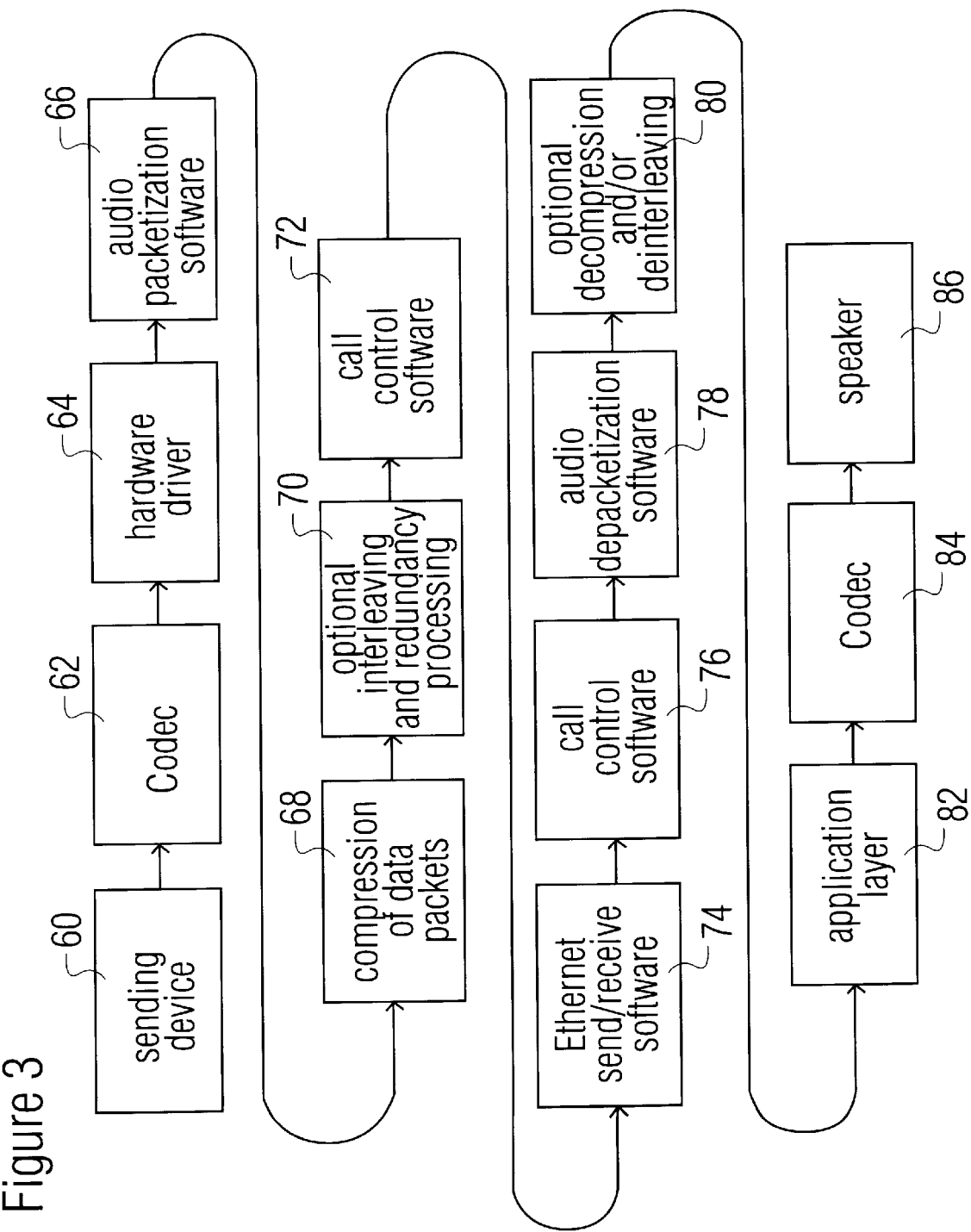
FIG. 3 is a flowchart illustration of the distributed control process used by sending and receiving peer communication devices to achieve peer-to-peer communications in accordance with the principles of the invention.

FIG. 3 is a flowchart illustration of the distributed control process used by sending and receiving peer communication devices for peer-to-peer communications within the system 10. As shown in FIG. 1, a plurality of peer communication devices (e.g., telephones, central office lines, voice mail channels, automated attendant channels, database managers) are connected via a packet based communications network 20. In one detailed embodiment, the network 20 can be an Ethernet network.

A user of a sending peer communication device (e.g., the telephone 22a) desires to place a call to a user of a receiving peer communication device (e.g., the telephone 22b). The sending device receives analog signals (i.e., the telephone number from the keypad or voice from a microphone) (at 60) and directs such signals into a Codec for analog into digital conversion (at 62). The Codec passes the stream of digital data to a hardware driver (at 64). The digital data is then fed into the HAL 52.

The HAL 52 passes the stream of digital data to the audio packetization software (at 66). The audio packetization software builds data packets from the stream of digital data and, to reduce the number of packets transmitted over the network, compresses the packets using standard compression techniques (at 68), such as pulse code modulation (PCM) compression (e.g., G.711), adaptive differential pulse code modulation (ADPCM) compression (e.g., G.722 or G.727) or code excited linear prediction (CELP) compression (e.g., G.723.1, G.728 or G.729). The packetization software can optionally perform interleaving and redundancy processing on the digital data to add to the robustness of the system (70). Interleaving is the process of sending the digital samples in two or more separate packets so that if one gets lost, the receiving device still receives some of the samples. Redundancy is the process of forming packets which are multiple copies of the same compressed digital data. These processes add to the robustness of the system by increasing the number of contiguous packets that can be lost before recovery is not practical. The expense of such processing is the addition of latency to the system.

The audio packetization software sends the data packets to the call control software. The call control software adds a header, which includes the ID of the receiving device, onto each packet (at 72). The call control software passes the packets to the Ethernet send/receive software for transmission from the sending device over the network to the receiving device. The Ethernet send/receive software includes high performance Ethernet driver software that attempts to send the data packets to the receiving device over the network (at 74).

By way of background, when a standard Ethernet driver attempting to send packets over the Ethernet network detects a collision with another packet, the driver waits (i.e., "backs off") for some period of time and then attempts to resend the packet. Ethernet protocol dictates a statistical increase in the amount of waiting time between each retry, which is referred to as the Ethernet backoff algorithm. Thus, for each retry in a heavily loaded network the amount of time that passes before a successful transmission increases. This waiting time is typically dictated by the Ethernet MAC chip and not directly by the Ethernet Driver code. After some number of retries (typically sixteen), the driver stops trying to transmit the packet. If the time to transmit the packet becomes too large, the receiving device is unable to incorporate the packet into its playback stream. The stream will therefore be missing a segment corresponding to the late packet.

A primary objective of the Ethernet driver is to insure that there are as few late packets as possible. This objective may be accomplished using one or more of the following processing techniques to transmit the data packets to the receiving device: (i) the Ethernet interpacket gap time for retransmitted data packets is reduced; (ii) the expected time delays associated with the Ethernet exponential backoff algorithm are reduced; and (iii) transmission of the packets is continued beyond the Ethernet retry limit. The expected time delays associated with the Ethernet exponential backoff algorithm are reduced by using at least one of the following techniques: (i) reduction of the time between retries; and (ii) resetting the normal Ethernet retry algorithm based on number of collisions or elapsed time.

Once the packets are successfully transmitted over the network, the high performance Ethernet driver of the receiving device receives the packets and passes them to the call control software (at 76). The call control software removes and processes the header information and passes the packets to the audio depacketization software (at 78).

The depacketization software decodes the packets and converts the decoded packets into a continuous stream of digital data (at 78). More specifically, the depacketization software queues the packets in a playback queue. Each packet taken off the queue is decoded into digital data. The process of decoding the packets into digital data may include one or more of the following data processing techniques: (i) decompression; or (ii) deinterleaving (80). Also, during the conversion process, the depacketizing software may use one or more of the following reconstruction techniques to mask the effects of missing decoded packets of the digital data: (a) interpolation; or (b) redundancy. These techniques, which can be known algorithms, are employed to effectively deal with the effect of missing data packets. The depacketization software attempts to synchronize the rate at which digital data is removed from the playback queue with the rate at which digital data is added to the playback queue to compensate for clock skew between the sending and receiving peer communication devices.

The decoded packets of digital data are converted into a continuous stream of digital data which is passed to the application layer (at 82). The Codec converts the stream of digital data received from the application layer to analog signals (at 84). The speaker plays the analog signals to the user (at 86).

Each peer communication device also includes the capability to simultaneously process packets of data from multiple sending devices (e.g., for a conference call). In such situations, the call control software of the receiving device receives data packets from multiple sending devices. The packets are processed, as described above, and sent to the depacketization software as multiple channels. The depacketization software forms a separate playback queue for each channel. For each channel, packets are taken off the respective queue and decoded into digital data using one or more of the data processing techniques described above. Further, the depacketization software performs a mixing function to create a composite stream of digital data which is passed to the application layer, the Codec, and to the speaker for playback to the user.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method for achieving peer-to-peer communications in a packet-based communications network, comprising the steps of
   providing a plurality of peer communication devices connected via a packet based communications network;
   converting raw data into digital data in a sending peer communication device;
   encoding the digital data into packets using one or more of the following data processing techniques (a) compression, (b) redundancy, and (c) interleaving;
   transmitting the one or more data packets from the sending peer communication device over the network to a receiving peer communication device including reducing the expected time delays associated with the Ethernet exponential backoff algorithm by resetting the normal Ethernet retry algorithm based on a number of collisions or elapsed time;
   decoding the data packets into digital data using one or more of the following data processing techniques (a) decompression, or (b) deinterleaving;
   converting the decoded packets of digital data into a continuous stream of digital data, including using one or more of the following reconstruction techniques to mask the effects of missing decoded packets of digital data (a) interpolation, or (b) redundancy.
   converting the continuous stream of digital data into raw data.

2. The method of claim 1 further comprising the step of optimizing the encoding, transmitting, decoding, and converting steps to (a) minimize packet loss, (b) minimize latency, and (c) minimize artifacts caused by packet loss.

3. The method of claim 1 wherein the peer communication devices include telephones, central office lines, voice mail channels, automated attendant channels, database managers.

4. The method of claim 1 wherein the raw data is audio signals.

5. The method of claim 1 wherein the network is an Ethernet network.

6. The method of claim 5 wherein the Ethernet network is 10BaseT, 10Base2, 100BaseTX, 100BaseVG anylan, or fiber.

7. The method of claim 1 further comprising the step of queuing the data packets of encoded digital data in a playback queue in order to convert the data packets into the contiguous stream of digital data.

8. The method of claim 7 wherein the step of queuing the data packets of encoded digital data further comprises the step of synchronizing the rate at which digital data is removed from the playback queue with the rate at which digital data is added to the playback queue to compensate for clock skew between the sending and receiving peer communication devices.

9. A method for achieving peer-to-peer audio communications in a packetbased communications network, comprising the steps of:
   providing a plurality of peer communication devices connected via an Ethernet network;
   converting audio signals received via an audio receiver into digital data within a sending peer communication device;
   encoding the digital data into packets using one or more of the following data processing techniques (a) compression, (b) redundancy, and (c) interleaving;
   adding a header to each packet of encoded digital data;
   transmitting the one or more data packets from the sending peer communication device over the network to a receiving peer communication device including resetting the normal Ethernet retry algorithm once based on a number of collisions or elapsed time and dropping one or more packets based on a number of collisions or after an elapsed time after initiating the reset Ethernet retry algorithm;
   removing the header from each data packet to obtain the packets of encoded digital data;
   decoding the data packets into digital data using one or more of the following data processing techniques (a) decompression, or (b) deinterleaving;
   converting the decoded packets of digital data into a continuous stream of digital data, including using one or more of the following reconstruction techniques to mask the effects of missing decoded packets of digital data (a) interpolation, or (b) redundancy;
   converting the continuous stream of digital data into audio signals; and outputting the audio signals via a audio transmitter.

10. The method of claim 9 wherein the Ethernet network is 10BaseT, 10Base2, 100BaseTX, 100BaseVG anylan, or fiber.

11. The method of claim 10 further comprising the step of queuing the data packets of encoded digital data in a playback queue in order to convert the data packets into the contiguous stream of digital data.

12. The method of claim 11 wherein the step of queuing the data packets of encoded digital data further comprises the step of synchronizing the rate at which digital data is removed from the playback queue with the rate at which digital data is added to the playback queue to compensate for clock skew between the sending and receiving peer communication devices.

13. The method of claim 10 further comprising the step of optimizing the encoding, transmitting, decoding, and converting steps to (a) minimize packet loss, (b) minimize latency, and (c) minimize artifacts caused by packet loss.

14. A method for achieving peer-to-peer communications in a packet-based communications network, comprising the steps of:
providing a plurality of peer communication devices connected via a packet based communications network;
encoding digital data into packets within a sending peer communication device;
transmitting the one or more data packets from the sending peer communication device over the network to a receiving peer communication device;
decoding the data packets into digital data within the receiving peer communication device;
converting the decoded packets of digital data into a continuous stream of digital data, including the steps of
(i) queuing the data packets of encoded digital data in a playback queue;
(ii) synchronizing the rate at which digital data is removed from the playback queue with the rate at which digital data is added to the playback queue to compensate for clock skew between the sending and receiving peer communication devices; and
(iii) using one or more of the following reconstruction techniques to mask the effects of missing decoded packets of digital data (a) interpolation, or (b) redundancy.

15. The method of claim 14 wherein the encoding step further comprises using one or more of the following data processing techniques (a) compression, (b) redundancy, and (c) interleaving.

16. The method of claim 14 wherein the decoding step further comprises using one or more of the following data processing techniques (a) decompression, or (b) deinterleaving.

17. The method of claim 14 wherein the transmitting step further comprises utilizing at least one of the following processing techniques (a) reducing the Ethernet interpacket gap time for retransmitted data packets, (b) reducing the expected time delays associated with the Ethernet exponential backoff algorithm, and c) repeating the transmitting step beyond the Ethernet retry limit.

18. The method of claim 17 wherein the expected time delays associated with the Ethernet exponential backoff algorithm are reduced by using at least one of the following techniques: (i) reduction of the time between retries; and (ii) resetting the Ethernet retry algorithm based on number of collisions or elapsed time.

* * * * *